UNITED STATES PATENT OFFICE.

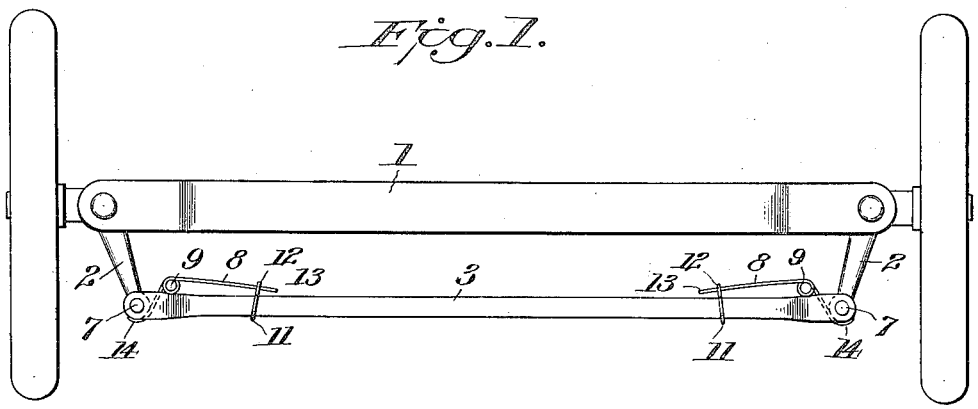
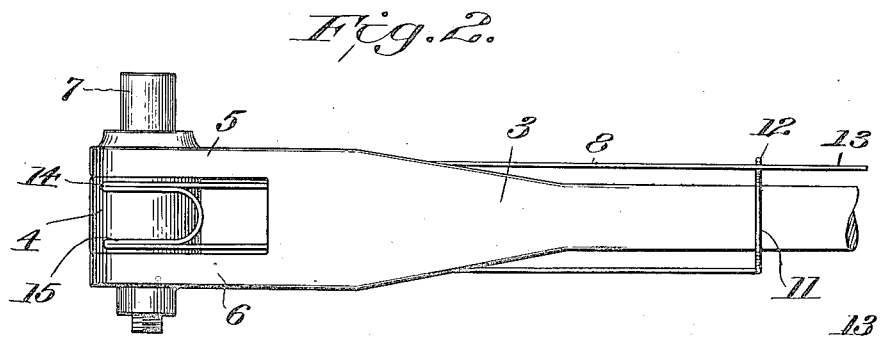
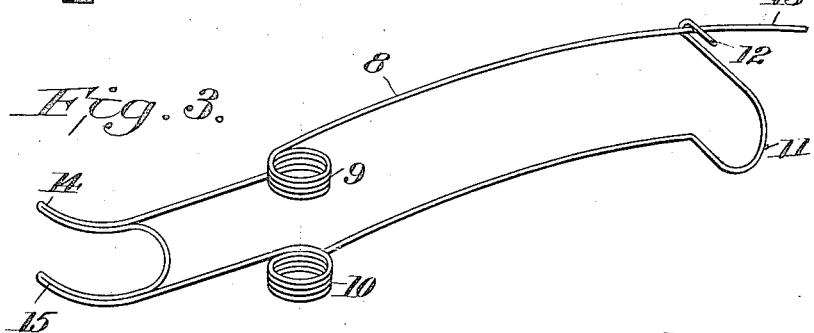

JOHN W. STAHL, OF LIVERPOOL, PENNSYLVANIA.

ANTIRATTLER FOR AUTOMOBILE STEERING DEVICES.

1,183,600.  Specification of Letters Patent.  Patented May 16, 1916.

Application filed October 27, 1915. Serial No. 58,192.

*To all whom it may concern:*

Be it known that I, JOHN W. STAHL, a citizen of the United States, residing at Liverpool, in the county of Northumberland and State of Pennsylvania, have invented certain new and useful Improvements in Antirattlers for Automobile Steering Devices, of which the following is a specification.

This invention relates to improvements in devices adapted to be removably attached to the steering knuckles of automobiles to prevent the parts from becoming loose and rattling, by taking up any lost motion in the same.

The various features of the invention will be hereinafter more fully described in connection with the accompanying drawing in which:—

Figure 1 is a top plan view of a steering device of an automobile connected to the axle of the same, with the invention attached. Fig. 2 is an end view of the steering knuckle and connecting rod with the device attached. Fig. 3 is a perspective view of the invention.

Referring to the drawing, 1 indicates the front axle of an automobile to which are attached the arms 2 of a steering device which in turn are pivotally secured to the connecting rod 3 of the steering device. The parts 2 and 3 are pivotally connected together by inserting the hollow T shaped ends of the arms 2 between the prongs 5 and 6 of the bifurcated ends of the rod 3, a bolt 7 passing through the ends 4 of the arms 2 and the prongs 5 and 6 of the connecting rod 3.

Referring to Fig. 3 there is shown a longitudinal spring 8 which is formed of a single piece of resilient material bent upon itself to form intermediate coiled springs 9 and 10, the coil 10 terminating in the loop portion 11 adapted to surround the rod 3 having the end bent upon itself to form an engaging part 12. The spring coil 9 terminates in the straight end 13 adapted to engage the part 12. The other end of the spring 8 has the parts bent upon themselves in the shape of an U for the purpose of permitting the arms 2 to pass between the ends 14 and 15 so that the action of the steering device is not limited in its motion.

This invention is applied to a steering device by inserting the U shaped end between the prongs 5 and 6 bearing upon and partly encircling the end 4 of the arm 2, the coiled springs 9 and 10 abutting against the side of the connecting rod 3, looped part 11 passing around the said rod 3 and the end 13 engaging the part 12. By this arrangement there is always tension on the spring coils 9 and 10 which holds the parts 14 and 15 into close engagement with the part 4 which takes up all wear upon said part and the bolt 7, thus preventing rattling of the parts. It will be seen that there is always equal pressure on the parts in any position. The device can be readily attached to any of the different forms of steering devices without the use of tools or the changing of any of the parts.

What I claim as new and desire to secure by Letters Patent is:—

In a device of the class described, a longitudinal spring formed from a single piece of resilient metal bent upon itself to form intermediate coils, one end of said spring bent upon itself to form a U shaped member adapted to engage a knuckle of a steering gear and receive the arm of said knuckle, the other end adapted to partly encircle a connecting rod of a steering device and lock the spring in place.

In testimony whereof I affix my signature in presence of two witnesses.

JOHN W. STAHL.

Witnesses:
 SARA O. YARNALL,
 C. W. CLEMENT.